(12) United States Patent
Fisher et al.

(10) Patent No.: US 8,791,375 B2
(45) Date of Patent: Jul. 29, 2014

(54) ELECTRICALLY CONDUCTIVE BUSHING CONNECTION TO STRUCTURE FOR CURRENT PATH

(75) Inventors: Robert E. Fisher, Everett, WA (US); James P. Irwin, Renton, WA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 12/970,827

(22) Filed: Dec. 16, 2010

(65) Prior Publication Data

US 2012/0152611 A1 Jun. 21, 2012

(51) Int. Cl.
*H02G 3/18* (2006.01)
*H01R 4/58* (2006.01)

(52) U.S. Cl.
USPC .......................................... 174/653; 439/86

(58) Field of Classification Search
USPC .......................................... 174/653; 439/86
See application file for complete search history.

(56) References Cited

U.S. PATENT DOCUMENTS

| | | | |
|---|---|---|---|
| 3,532,024 A | | 10/1970 | Gutshall |
| 4,083,622 A | * | 4/1978 | Neidecker ........................ 439/86 |
| 4,310,273 A | * | 1/1982 | Kirrish ............................ 411/338 |
| 4,502,092 A | * | 2/1985 | Bannink et al. ................. 361/218 |
| 4,755,904 A | * | 7/1988 | Brick ............................... 361/117 |
| 5,709,356 A | * | 1/1998 | Avenet et al. .................. 244/1 A |
| 5,937,361 A | * | 8/1999 | Smith ......................... 455/575.1 |
| 5,993,254 A | * | 11/1999 | Pitschi et al. .................. 439/584 |
| 6,119,305 A | * | 9/2000 | Loveall et al. .................... 16/2.2 |
| 6,335,482 B1 | * | 1/2002 | Mason ............................ 174/359 |
| 6,359,224 B1 | * | 3/2002 | Beele .............................. 174/665 |
| 7,576,966 B2 | | 8/2009 | Heeter |
| 7,726,200 B2 | * | 6/2010 | Friedberger et al. ............. 73/802 |
| 8,381,934 B2 | * | 2/2013 | Brewer et al. .................. 220/235 |
| 2003/0044256 A1 | | 3/2003 | Nickerson et al. |
| 2008/0078864 A1 | | 4/2008 | Wilkerson et al. |
| 2008/0116319 A1 | * | 5/2008 | Negley et al. .................. 244/119 |
| 2009/0178262 A1 | * | 7/2009 | Reid et al. ........................ 29/263 |
| 2009/0233469 A1 | * | 9/2009 | Tobey et al. ..................... 439/97 |
| 2010/0226061 A1 | * | 9/2010 | Sutton et al. ................... 361/216 |
| 2011/0049834 A1 | * | 3/2011 | Natu .............................. 280/279 |
| 2013/0075150 A1 | * | 3/2013 | Newbolt et al. ............... 174/360 |
| 2013/0087380 A1 | * | 4/2013 | Dilligan et al. ............... 174/650 |
| 2013/0280929 A1 | * | 10/2013 | Warwick et al. ................ 439/86 |

FOREIGN PATENT DOCUMENTS

| | | |
|---|---|---|
| EP | 0425292 A1 | 5/1991 |
| EP | 1903221 A2 | 3/2008 |
| FR | 2933378 A1 * | 1/2010 |
| GB | 2269945 A * | 2/1994 |

* cited by examiner

*Primary Examiner* — Jeremy C Norris
*Assistant Examiner* — Nathan Milakovich
(74) *Attorney, Agent, or Firm* — Felix L. Fischer

(57) ABSTRACT

An electrically conductive structural connection employs a pass through or fastener having a first diameter. A fastener hole, with a second diameter larger than the diameter of the pass through, extends through a thickness of a structure and receives the pass through. A bushing having a diameter and a thickness to fit between the first and second diameters extends though and past the thickness of said structure. When the feedthrough is compressively secured to the structure, the bushing expands radially between the first diameter and the second diameter to maintain at least one contact point between the fastener and the structure.

15 Claims, 9 Drawing Sheets

ELECTRICALLY CONDUCTIVE BUSHING CONNECTION TO STRUCTURE FOR CURRENT PATH

BACKGROUND INFORMATION

1. Field

Embodiments of the disclosure relate generally to fittings for electrical continuity and conductivity and more particularly to embodiments for a compressible expanding bushing having contact points for electrical continuity through a hole in carbon fiber resin composite beams to carry streaming current and lightning induced currents that must be connected to structure electrically to prevent a spark being formed.

2. Background

The use of Carbon Fiber Reinforced Polymer (CFRP) composites in structural applications for aerospace vehicles and other systems is now common practice. Certain structural systems require conductive capability for lightning protection and other electrical applications that metal structure has always naturally provided. However, CFRP structures lack the same conductive capabilities as metal structures. In particular, holes through CFRP structures may create conditions for sparking due to lack of continuous electrical conductivity. For applications such as fuel tank structures pass through fittings require holes in the structure to accommodate hydraulic lines, sensors and other systems. As an example, hydraulic bulkhead fittings through CFRP composite beams carry streaming current and lightning induced currents that must be connected to structure electrically to prevent a spark being formed within a fuel tank installation.

To accommodate such requirements in an example system, a precision hole was formed in the CFRP beam and a metal bushing was press fitted into the hole with sufficient interference to maintain contact with the carbon fiber extending to the inside diameter of the hole. This requires a precision diameter hole be formed in CFRP material to accept a precision outside diameter bushing in order to create contact pressure between the inside of the hole and outside of the bushing. This contact pressure is required for conducting electrical current from the bolt that passes through the bushing to the carbon fibers that extend to the inner surface of the through hole. The existing construction typically requires an exotic material with very low thermal coefficient of expansion to match the CFRP. This contact pressure is required to complete an electrical circuit with sufficient current carrying capacity to dissipate current induced on the hydraulic tubes. High precision is required to assure contact pressure is maintained against the carbon fibers in the inside diameter of installation holes mounting the bulkhead fitting.

CFRP structures may additionally have corrosion issues with respect to certain materials. Consequently, selection of a precision metal bushing additionally requires anticorrosion compatibility with the CFRP structure in addition to the thermal expansion considerations. This may significantly limit material selection.

It is therefore desirable to provide a current carrying bushing with electrical contact capability which eliminates the requirement for precision boring and precision machining of fittings. It is also desirable to provide a bushing which does not require costly materials to maintain thermal expansion matching while retaining anticorrosion compatibility with the CFRP.

SUMMARY

Embodiments disclosed herein provide an electrically conductive structural connection which employs a pass through or fastener having a first diameter. A fastener hole, with a second diameter larger than the diameter of the pass through, extends through a thickness of a structure and receives the pass through. A bushing having a diameter and a thickness to fit between the first and second diameters extends though and past the thickness of said structure. When the pass through is compressively secured to the structure, the bushing expands radially between the first diameter and the second diameter to maintain at least one contact point between the fastener and the structure.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
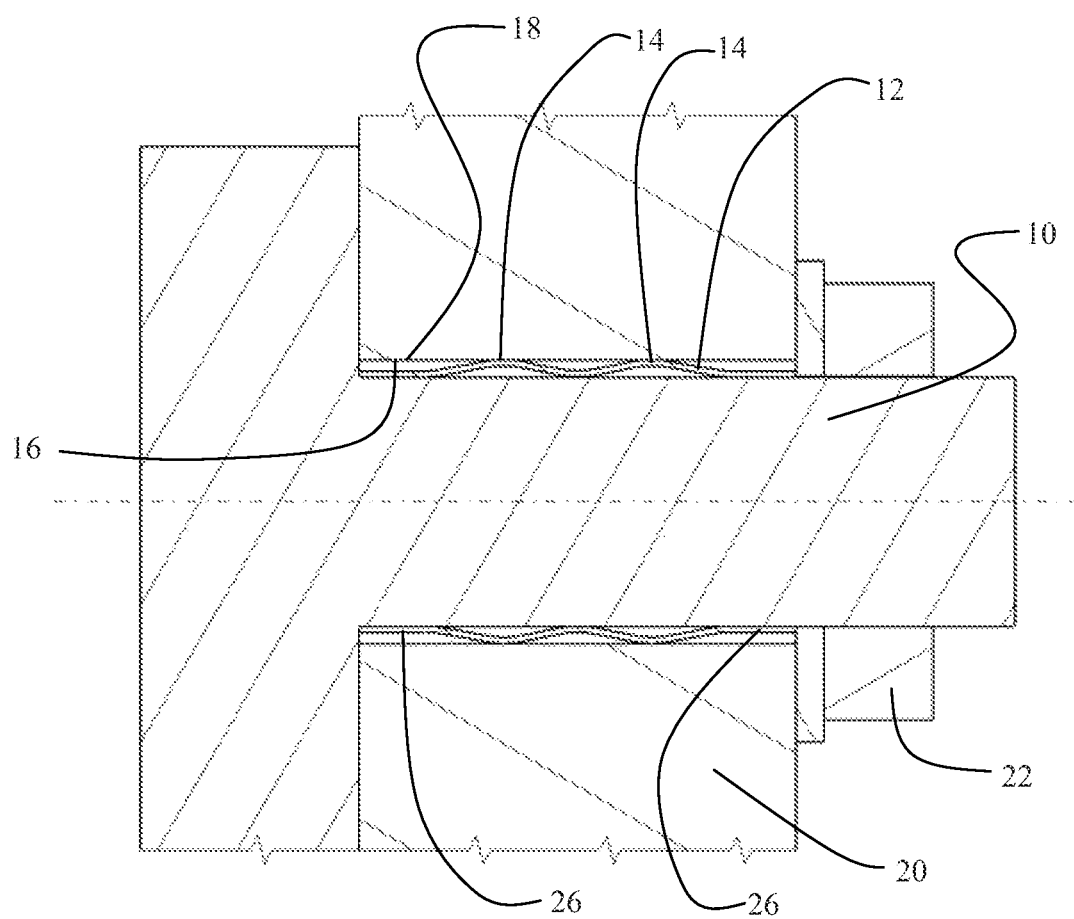
FIG. 1 is a section view of a first embodiment of a compressible conductive bushing with multiple contact points for a bolt feedthrough.

The embodiments described herein demonstrate an expanding bushing that maintains contact pressure on the inside of a close fitting hole to conduct electrical current from a through bolt or pass through to the supporting structure without sparking. Referring to the drawings, FIG. 1 shows an example pass through fastener such as bolt 10 having a first diameter inserted through an expanding bushing 12 with multiple circumferential contacts 14 to maintain required pressure of the bushing against the inside wall 16 of an installation hole 18 having a second diameter in CFRP structure 20. The bushing 12 initially extends past the extents of the hole in an uncompressed condition. Spring pressure is created by tightening nut 22 on the bolt (threads on the nut and bolt are not shown for simplicity) and compressing the length of the bushing, as will be described in greater detail subsequently. The length compression causes the bushing to increase in diameter on the outside and decrease in diameter on the inside. The thermal coefficient of expansion of the bushing material is of reduced concern since the contact between the CFRP and the bushing contact points can be maintained due to the elastic spring force over a large range of temperatures. Consequently a much less costly material can be used for the bushing.

Figure 2:
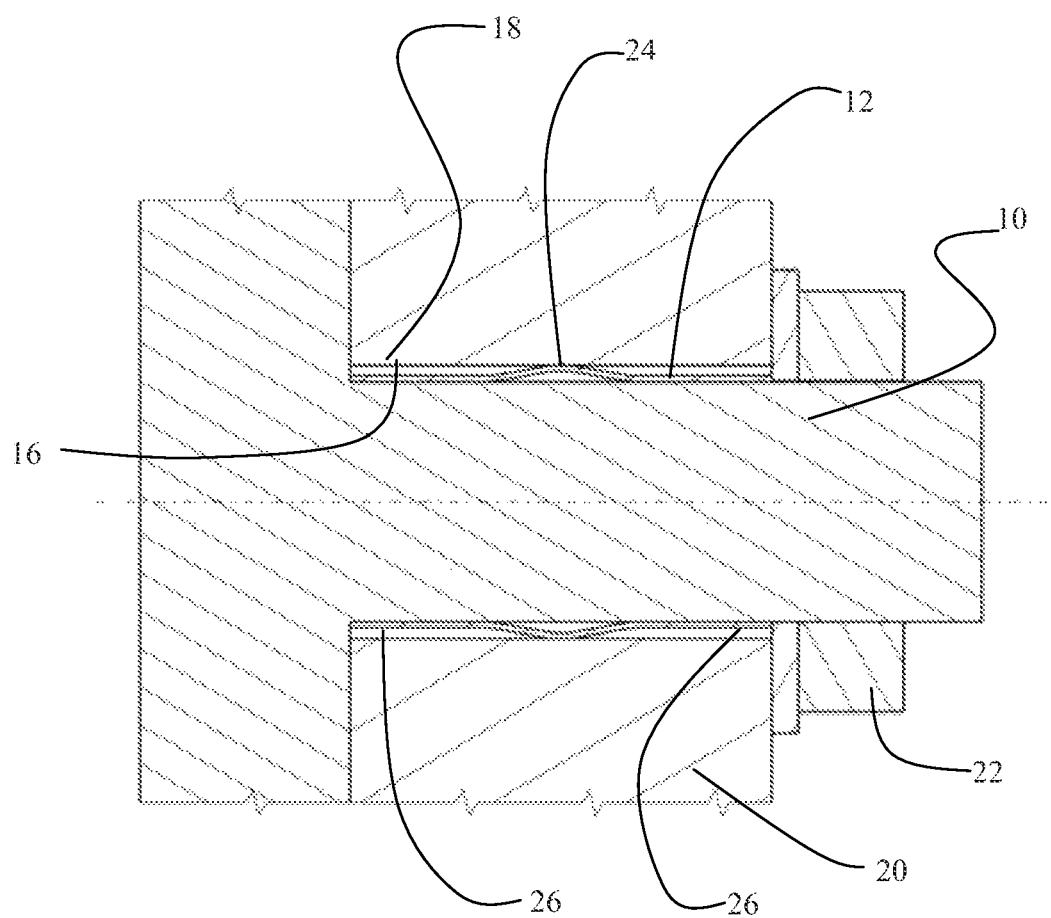
FIG. 2 is a section view of a second embodiment of a compressible conductive bushing with single contact points for a bolt feedthrough.

A second embodiment is shown in FIG. 2 wherein an expanding bushing 12 with one circumferential contact 24 maintains required pressure of the bushing against the inside diameter 16 of the installation hole 18 in CFRP structure 20. As with the first embodiment, spring pressure is created by tightening nut 22 on the bolt and compressing the length of the bushing. The length compression causes the bushing to increase its diameter on the outside and decrease in its inside diameter. For both the first and second embodiments, bushing 12 has end sections 26 which have a diameter to be closely received on the bolt 10.

The embodiments disclosed in FIGS. 1 and 2 may be used with, for example, a flange attachment to the CFRP structure with a bolt pattern, each bolt in the pattern being received through a hole in the CFRP structure as described. Such bolts may range in size from 5/16 inch to 3/8 inch or larger. In applications of that type, a 0.020 inch thickness tube of stainless steel or titanium may be employed as a precursor for fabrication of the compressible bushing, as will be described in greater detail subsequently.

Figure 3:
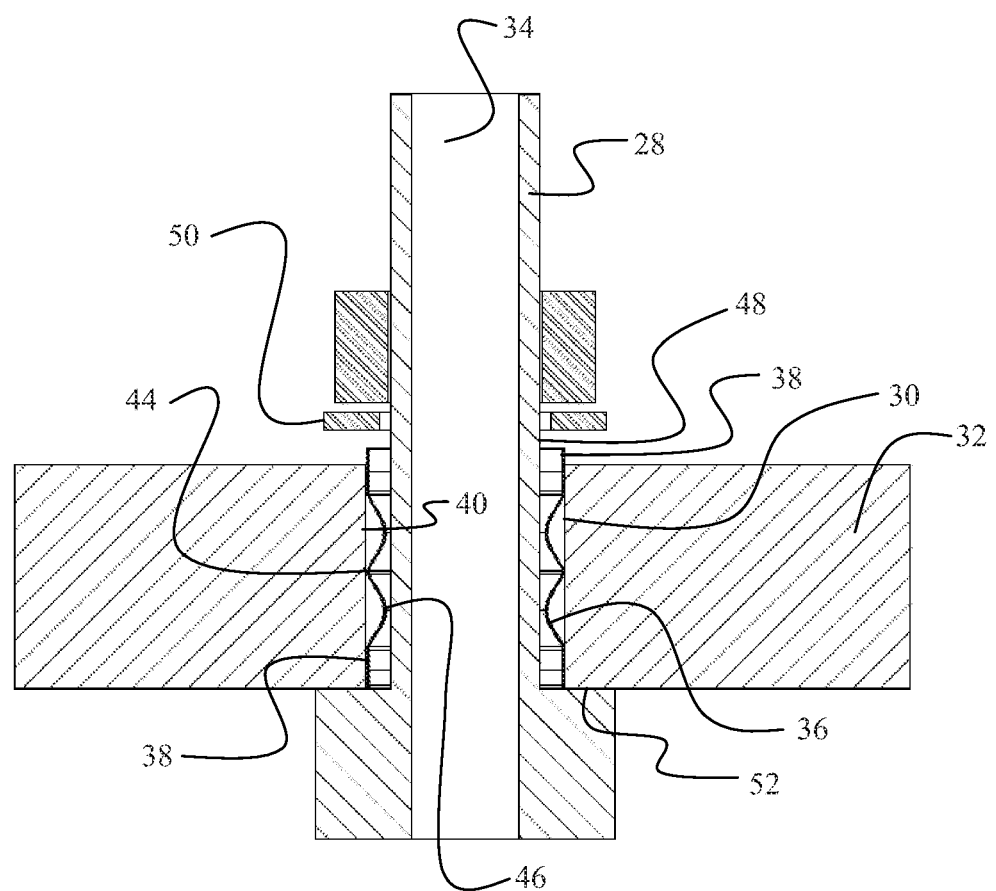
FIG. 3 is an exploded side section view of a third embodiment of a compressible conductive bushing with multiple contact points for a hydraulic feedthrough in the uncompressed condition.
Figure 4:
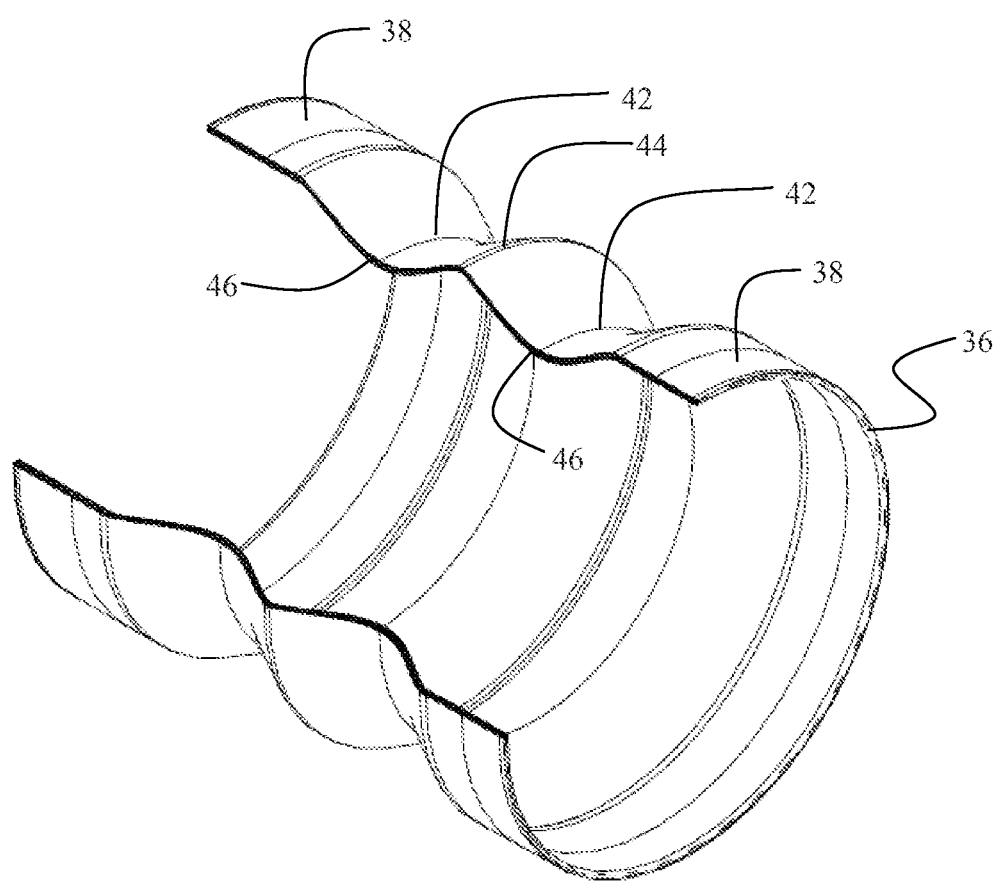
FIG. 4 is a detailed isometric partial section view of the compressible conductive bushing of FIG. 3.

A third embodiment is shown in FIG. 3 for a pass through 28 received through a hole 30 in a CFRP structure 32. The pass through may be significantly larger in diameter than the bolts discussed with respect to the embodiments of FIGS. 1 and 2 with diameters of up to 1.0 inch or greater. For the embodiment shown, the pass through incorporates a central bore or channel 34 and may constitute a hydraulic line, an electrical conduit or comparable structure. Bushing 36, shown in detail in FIG. 4, incorporates end portions 38 having a diameter to be received in close contact with inner diameter 40 of hole 30 and is shown in the uncompressed state in FIG. 3. Accordion pleats 42 formed in the bushing, as will be described in greater detail subsequently, expand diametrically, inward and outward, upon compression of the bushing axially to provide outer contact points 44 for engagement of the inner diameter 40 of hole 30 and inner contact points 46 for contact with outer diameter 48 of the pass through 28. For the embodiment shown, two pleats are employed providing one outer diameter contact (with the hole in the CFRP structure) and two inner diameter contacts (with the pass through). In alternative embodiments, additional pleats may be employed for additional contacts.

Figure 5:
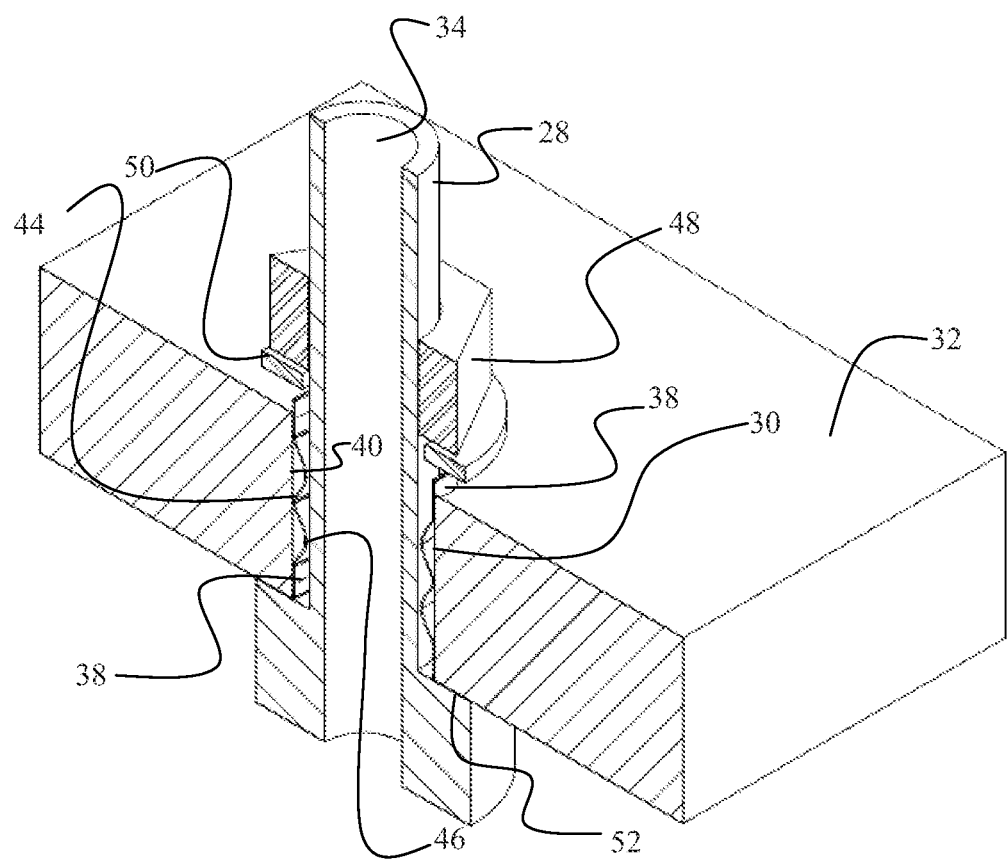
FIG. 5 is an isometric view of the embodiment of FIG. 3 with the uncompressed bushing.

In the uncompressed condition as shown in FIGS. 3 and 5, the bushing extends beyond the hole in the CFRP structure to be engaged for compression. Nut 48 is received on mating external threads (not shown for simplicity) on the pass through and engages a bearing washer 50 which contacts the bushing 36. Upon tightening of the nut 48 to secure the feedthrough in the hole of the CFRP structure 32, end portions 38 of the bushing are engaged by the bearing washer 50 on a first end and a shoulder 52 on the feedthrough on a second end. In alternative embodiments nuts with associated washers may be employed to secure the feedthrough on both sides of the CFRP structure and compress the bushing.

Figure 6:
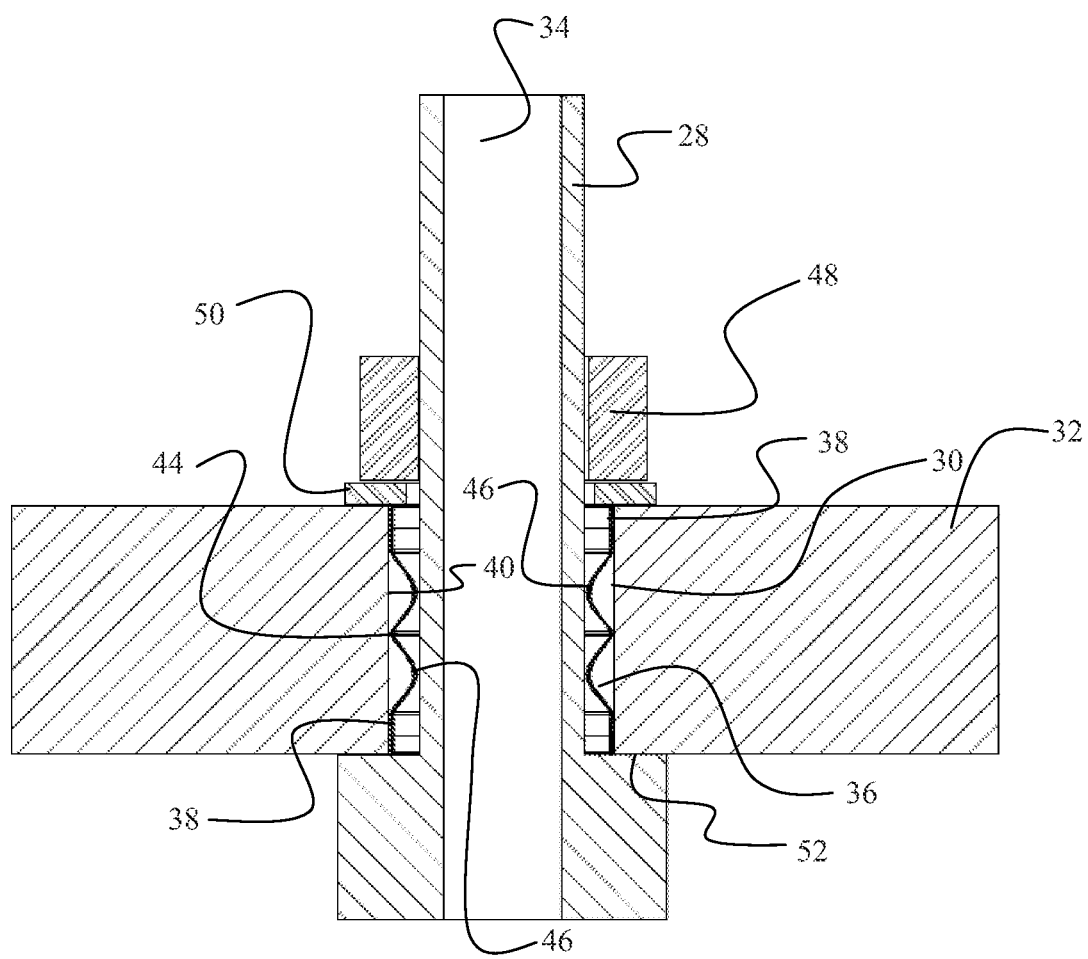
FIG. 6 is a section view of the embodiment of FIG. 3 in the compressed condition.
Figure 7:
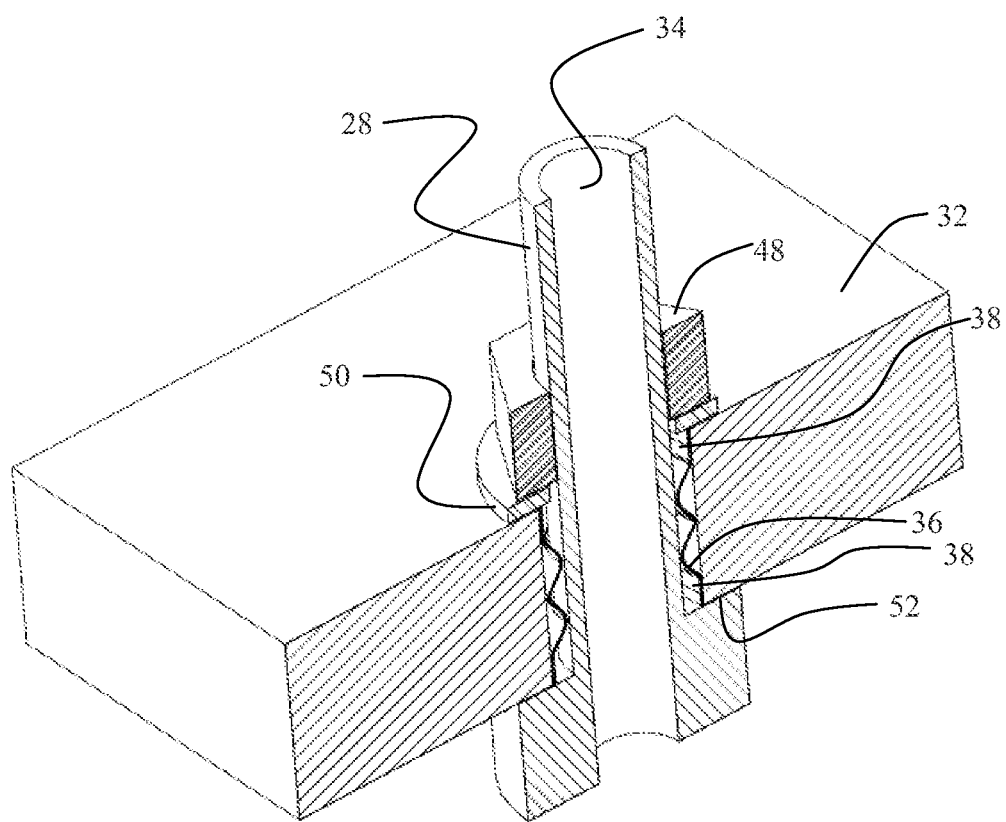
FIG. 7 is an isometric view of the embodiment of FIG. 3 in the compressed condition.
Figure 8:
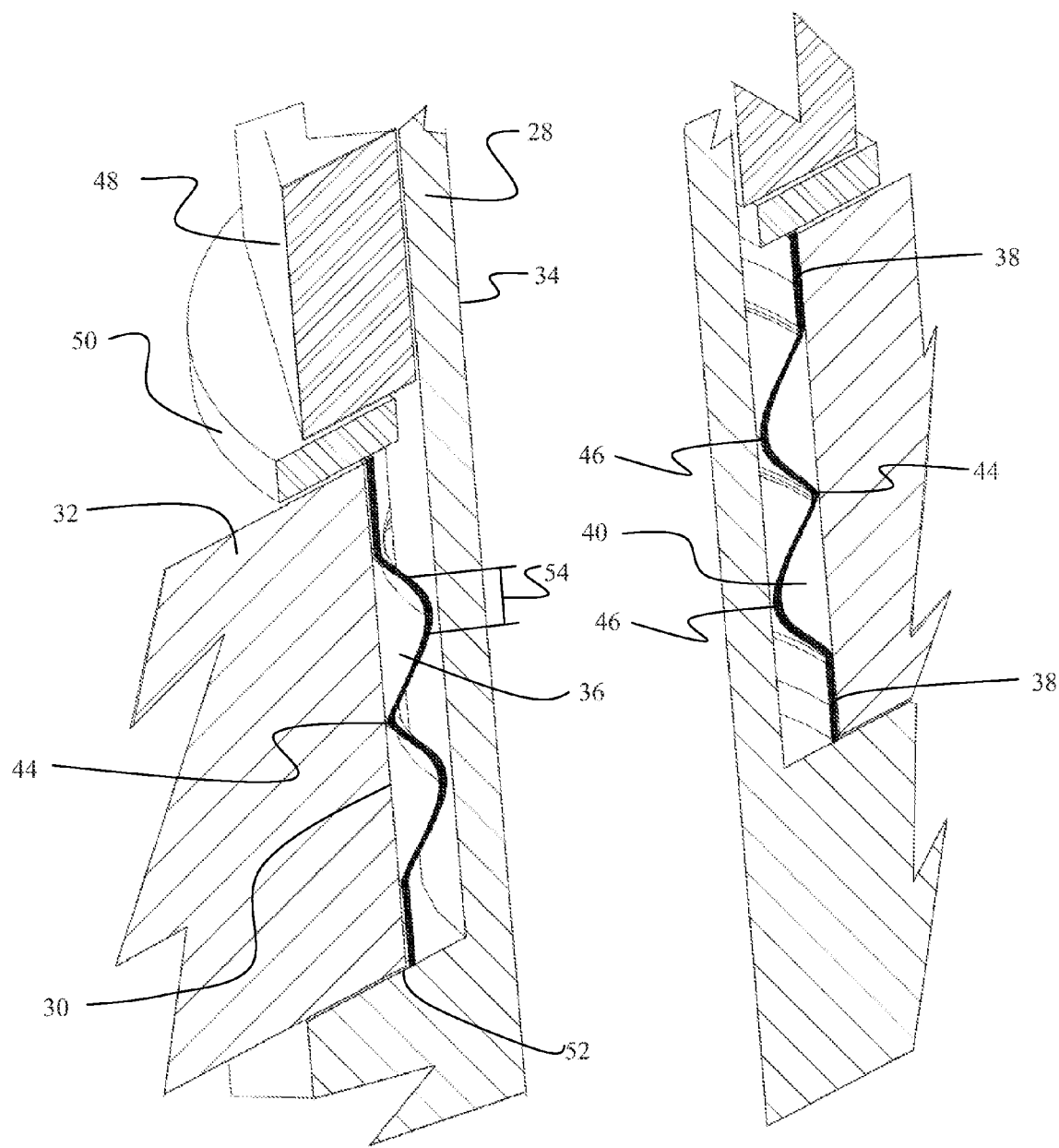
FIG. 8 is a detailed view of the bushing interface with the hole and feedthrough; and, FIG. 9 is a flowchart for a method to manufacture and employ the compressible bushing.

The bushing in the compressed state is shown in FIGS. 6, 7 and 8. The overall length of the bushing 36 including the end portions 38 and the number and depth of the accordion pleats 42 in the bushing are selected to accommodate the required expansion for firm electrical contact with both the pass through 28 and CFRP hole 30 when compressed by the nut and bearing washer. Preferably the bushing 36 remains elastically deformed to provide spring force to accommodate thermal expansion and contraction of the CFRP and pass through elements. The vertex of the pleats 42 may additionally be contoured as shown in FIG. 8 to provide a bight 54 which flattens against the opposing surface (pass through or hole) to accommodate additional diametric expansion of the bushing during axial compression thereby further reducing tolerancing requirements. Flattening of the bight 54 provides additional contact surface to further enhance the electrical properties.

For any of the three embodiments disclosed, the end portions of the bushings may be scored or shaped to diametrically expand (or contract) under compression of the bushing for firm contact with the hole or pass through adjacent which they are closely received thereby adding further contact area for electrical conductivity. Additionally, while the first embodiment shows both end portions closely received by the bolt on an inner diameter of the bushing and the second embodiment shows both end portions closely received by the hole on an outer diameter, in alternative embodiments, one end portion may be in close contact on the inner diameter (with the bolt or pass through) while the opposite end portion may be in close contact on the outer diameter with the hole in the CFRP structure). In yet other alternative embodiments, the end portions may have a diameter placing the end portion intermediate the hole diameter and feedthrough diameter. The number and shaping of accordion pleats may be chosen based on expansion and conductivity requirements. While a bolt and a hydraulic or electrical pass through have been employed as exemplary elements, any externally threaded element extending through a hole in the CFRP structure may employ the continuity contact capability of the compressible bushing as disclosed in the embodiments herein.

The embodiments described additionally provide the benefit of easy disassembly, if required, for removal of the feedthrough or bolts with significantly reduced potential for damage of the CFRP structure over a precision press fit bushing in a precision hole. Maintaining the sizing of the compressible bushing for elastic deformation results in relaxation of the diametric pressure exerted by the bushing upon withdrawal of the compressing nut and washer. Even if some plastic deformation has occurred, the relatively thin wall section of the compressible bushing allows stretching of the bushing for removal without excessive forces.

Figure 9:
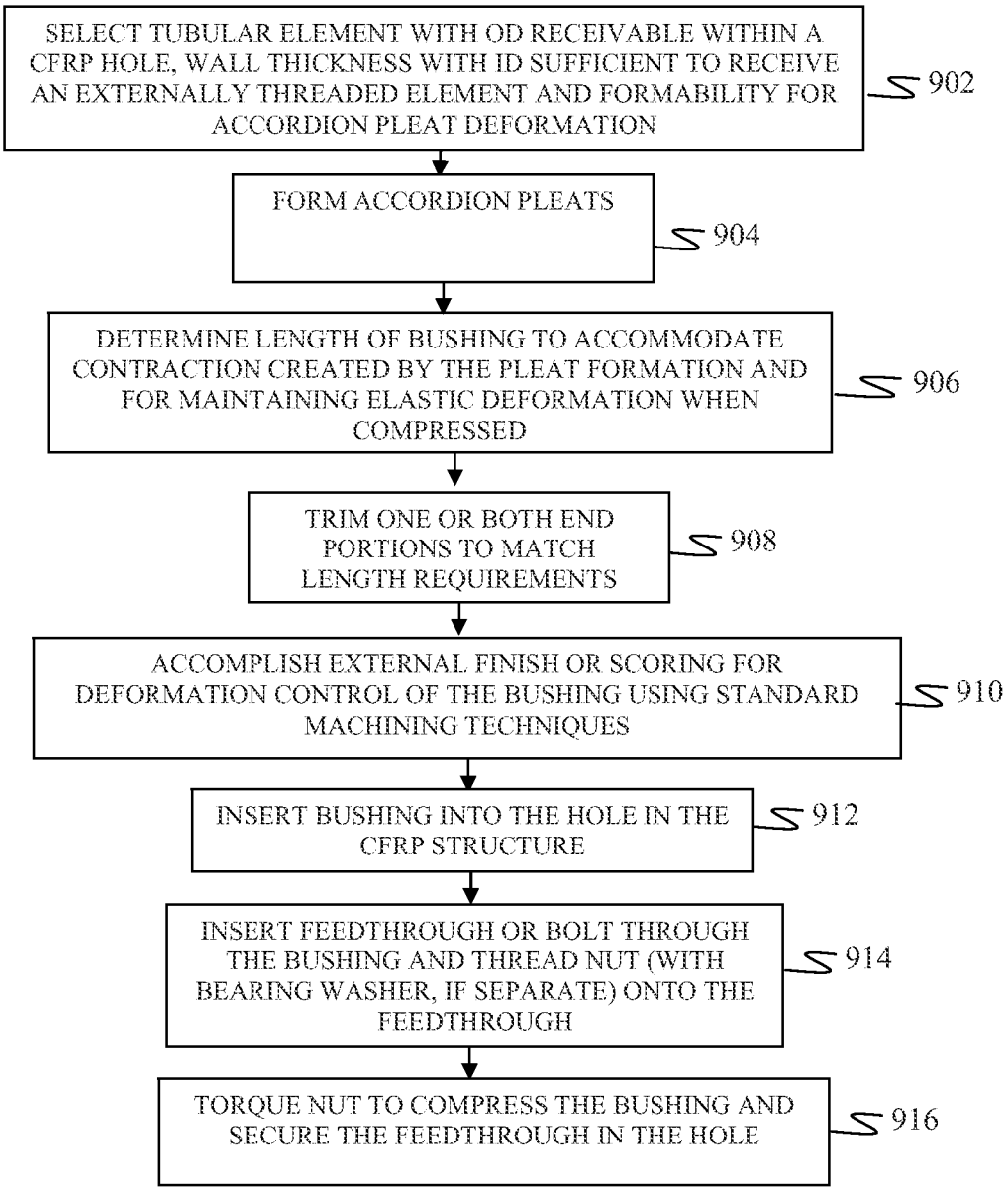

A method for fabrication and use of the compressible bushing is described in FIG. 9. Initial fabrication of the bushing may be accomplished by selection of a tubular element with an outer diameters receivable within a CFRP hole and a wall thickness with inner diameter sufficient to receive an externally threaded element and formability for accordion pleat deformation, step 902. For exemplary bushings titanium or stainless steel may be employed for anticorrosion compatibility with the CFRP. A three roller deformation system may be employed with a roller pair external to the tube and a matching roller internal to the tube between the external roller pair for forming of accordion pleats, step 904. Length of the bushing is determined to accommodate any contraction of the tube created by the pleat formation and for maintaining elastic deformation in the bushing when compressed in service, step 906, and trimming of the one or both end portions to match length requirements may be accomplished after pleating, step 908. External finishing or scoring for deformation control of the bushing may be accomplished using standard machining techniques, step 910.

For assembly, compressible bushing is inserted into the hole in the CFRP structure, step 912. The feedthrough or bolt is inserted through the bushing and the nut (with bearing washer, if separate) is threaded onto the feedthrough, step 914. The nut is then torqued to compress the bushing and secure the feedthrough in the hole, step 916.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An electrically conductive structural connection, comprising:
   a fastener having a first diameter;
   a carbon fiber resin composite structure having a fastener hole with a second diameter larger than the first diameter extending through a thickness of the structure and receiving the fastener;
   an electrically conductive bushing extending through and past the thickness of said structure between said first and second diameters in an uncompressed condition and wherein when said fastener is compressively secured to said structure, the bushing is elastically deformed to said thickness and between said first diameter and said second diameter to maintain at least one contact point between the fastener and the structure to conduct electrical current.

2. The electrically conductive structural connection of claim 1, wherein said bushing incorporates a plurality of pleats and when said fastener is compressively secured to said structure, the bushing is elastically deformed to said thickness and between said first diameter and said second diameter to maintain a plurality of contact points between the fastener and the structure.

3. An electrically conductive compressible bushing system for carbon fiber reinforced polymer (CFRP) structures comprising:
   a CFRP structural element having a feedthrough hole extending through a thickness of the CFRP structural element;
   an externally threaded feedthrough having a diameter to be received in the hole and compressively secured to the CFRP structural element;
   a bushing received within the hole intermediate the hole and feedthrough, said bushing having an uncompressed length extending through and past the thickness and a compressed length equal to said thickness with expanded inner and outer diameter, said expanded inner and outer diameter contacting the hole and feedthrough for electrical conductivity; and,
   a nut received on the external threads of the feedthrough, said nut tightened to urge the bushing to the compressed length.

4. The electrically conductive compressible bushing system for carbon fiber reinforced polymer (CFRP) structures as defined in claim 3 wherein the bushing incorporates at least one accordion pleat intermediate opposite end portions, said accordion pleat expanding diametrically upon compression of the end portions by the nut.

5. The electrically conductive compressible bushing system for carbon fiber reinforced polymer (CFRP) structures as defined in claim 3 further comprising a bearing washer intermediate the nut and bushing.

6. The electrically conductive compressible bushing system for carbon fiber reinforced polymer (CFRP) structures as defined in claim 4 wherein the bushing incorporates a plurality of accordion pleats intermediate opposite end portions, said accordion pleats elastically expanding diametrically upon compression of the end portions by the nut.

7. The electrically conductive compressible bushing system for carbon fiber reinforced polymer (CFRP) structures as defined in claim 4 wherein the accordion pleats incorporate a shaped bight at a vertex to accommodate expansion against the hole.

8. The electrically conductive compressible bushing system for carbon fiber reinforced polymer (CFRP) structures as defined in claim 3 wherein the bushing incorporates first and second end portions having diameters closely received by the feedthrough and spaced from the hole.

9. The electrically conductive compressible bushing system for carbon fiber reinforced polymer (CFRP) structures as defined in claim 3 wherein the bushing incorporates first and second end portions having diameters closely received by the hole and spaced from the feedthrough.

10. The electrically conductive compressible bushing system for carbon fiber reinforced polymer (CFRP) structures as defined in claim 3 wherein the feedthrough is a bolt.

11. The electrically conductive compressible bushing system for carbon fiber reinforced polymer (CFRP) structures as defined in claim 3 wherein the feedthrough is a hydraulic line.

12. The electrically conductive compressible bushing system for carbon fiber reinforced polymer (CFRP) structures as defined in claim 3 wherein the feedthrough is an electrical conduit.

13. The electrically conductive compressible bushing system for carbon fiber reinforced polymer (CFRP) structures as defined in claim 3 wherein the bushing is fabricated from stainless steel or titanium.

14. A method for maintaining electrical conductivity through a hole in carbon fiber reinforced polymer (CFRP) structures comprising:
   selecting an electrically conductive bushing for a feedthrough having a diameter received within a feedthrough hole in a CFRP structure, the electrically conductive bushing having an outer diameters receivable within the feedthrough hole having a wall thickness with inner diameter sufficient to receive the feedthrough and formability for accordion pleat deformation;
   deforming the electrically conductive bushing to form accordion pleats;
   determining length of the electrically conductive bushing to accommodate any contraction created by the pleat formation and for maintaining elastic deformation in the bushing when compressed in service;
   inserting the compressible pleated bushing into and extending past a thickness of the hole in the CFRP structure;
   inserting a feedthrough through the bushing;
   threading a nut onto the feedthrough;
   torquing the nut to compress the bushing to a compressed length equal to said thickness with expanded inner and outer diameter, said expanded inner and outer diameter contacting the hole and feedthrough for electrical conductivity and to secure the feedthrough in the hole.

15. A method for maintaining electrical conductivity in a carbon fiber reinforced polymer (CFRP) structures comprising:
   inserting an electrically conductive compressible pleated bushing into a hole in the CFRP structure, extending through and past a thickness of said structure between first and second diameters in an uncompressed condition;
   inserting a fastener having a diameter equal to the first diameter through the bushing;
   threading a nut onto the fastener; and,
   torquing the nut to elastically compress the bushing to the thickness and expanding pleats to the first and second diameter to maintain at least one contact point with the hole in the CFRP structure at the first diameter and the fastener at the second diameter to conduct electrical current and secure the fastener in the hole.

* * * * *